United States Patent [19]

Dreschmann et al.

[11] Patent Number: 4,941,759
[45] Date of Patent: Jul. 17, 1990

[54] COMB SEPARATOR FOR BALL BEARINGS

[75] Inventors: Peter Dreschmann, Dittelbrunn; Horst Gutsche, Schweinfurt, both of Fed. Rep. of Germany

[73] Assignee: FAG Kugelgischer Georg Schafer (KGaA), Fed. Rep. of Germany

[21] Appl. No.: 370,237

[22] Filed: Jun. 22, 1989

[30] Foreign Application Priority Data

Jun. 27, 1988 [DE] Fed. Rep. of Germany ....... 3821613

[51] Int. Cl.$^5$ .................. F16C 33/38; F16C 33/44
[52] U.S. Cl. .................... 384/531; 384/470; 384/526
[58] Field of Search ............ 384/463, 470, 523, 526, 384/531, 532, 533

[56] References Cited

U.S. PATENT DOCUMENTS 1,915,288 6/1933 Bott ..................... 384/531
4,126,362 11/1978 Hamblin et al. ............ 384/526

FOREIGN PATENT DOCUMENTS 2314464 10/1974 Fed. Rep. of Germany ...... 384/527
3300653 7/1984 Fed. Rep. of Germany ...... 384/523
1370890 10/1974 United Kingdom ............. 384/527

Primary Examiner—Thomas R. Hannon
Attorney, Agent, or Firm—Ostrolenk, Faber, Gerb & Soffen

[57] ABSTRACT

A comb separator for a ball bearing the bearing comprising axially spaced inner raceways defined in a shaft, outer raceways defined in an outer ring around the shaft and a respective row of bearing balls in the cooperating raceways. A comb separator is provided for each row of bearing balls. The comb separator has a plurality of circumferentially spaced arms facing axially inwardly toward the balls from an annular ring of the separator. First arms include respective lips wrapping around the ball that is in the ball receiving pocket adjacent to the lip. A projection that extends axially is located between the lips of each first arm. Second arms alternate with the first arms and each second arm has an axial passage opening through it for transmitting lubricant through it. A circumferential groove is defined on the axially outward side of the ring of the separator.

8 Claims, 1 Drawing Sheet

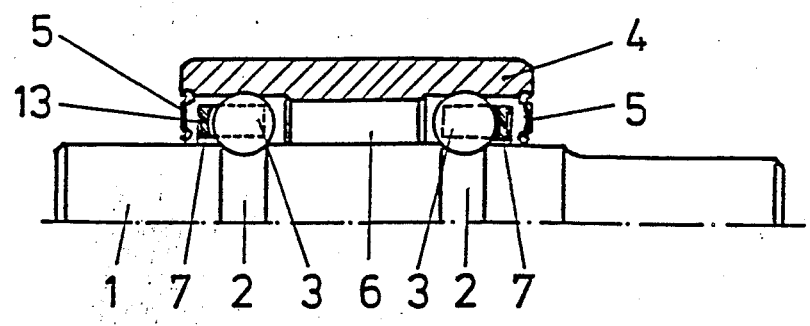
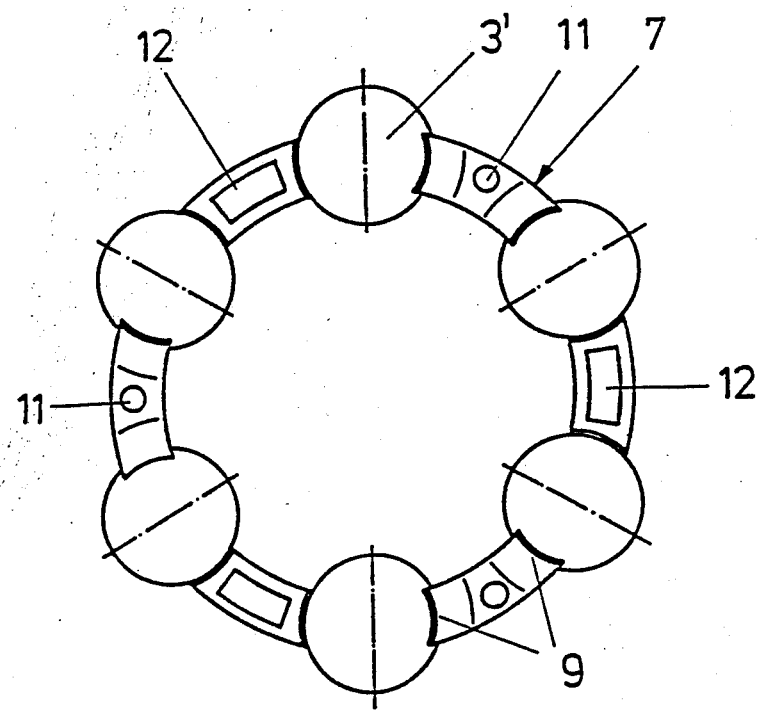
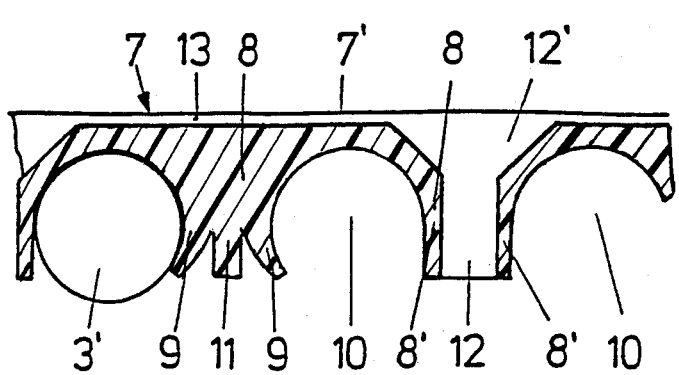

COMB SEPARATOR FOR BALL BEARINGS

BACKGROUND OF THE INVENTION

The present invention relates to a plastic comb separator or cage for ball bearings. The invention is particularly useful for water pumps of motor vehicles although it is not limited to any application. The plastic comb separator retains the balls in their appropriate relative positions.

Assembly of balls and a separator has entailed difficulties in the case of two-row ball bearings, particularly those in the water pumps of motor vehicles, in which two raceways are arranged radially spaced apart, one in a shaft which passes through the bearing and one in a single piece outer ring around the shaft. Difficulties can usually be avoided by using a so called comb separator or cage, which is provided with resilient holding lips that axially fix the separator in the bearing after installation. In one such bearing, which is shown in British Patent 1,370,890, projections are additionally formed in the separator between the holding lips. These projections are adapted for distribution of the balls into substantially separated pockets and for serving as resting surfaces for ejector pins upon manufacturer of the separators.

Because the radial space between the shaft and the outer ring is substantially filled by the separator, it is often difficult to feed lubricant into the bearing. Lubricant is introduced after bearing assembly into the space through which the ball bearing bodies move. The lubricant accumulates between the separator and the seal which is located axially outward of the separator and between the races. When the bearing is placed in operation, the lubricant is forced axially toward the seal, which may cause grease to emerge from inside the seal and may cause the seal to be pushed axially out of its seat.

SUMMARY AND OBJECTS OF THE INVENTION

A primary object of the present invention is to improve the cage or separator of a bearing so that lubricant passes more easily into the interior space of the bearing.

Another object is to retain the bearing balls in the separator.

A further object is to enable insertion of the separator between the races.

The comb separator of the invention is provided with axially extending arms at one axial side of an annular ring part defined on one axial side of the separator. Some of the arms, and preferably alternate arms, carry ball holding lips, which wrap behind the balls in both pockets adjacent each lip carrying arm of the comb separator. Those arms on which the lips are defined also have projections that project axially between the lips toward the open side of the separator. The projections help retain the balls in their proper positions. The bearing balls may be inserted into the pockets of the comb separator past the lips.

In others of the arms, and particularly the alternate arms, of the separator, axially extending passage openings for lubricant are provided. These openings enable the addition of lubricant after the bearing has been assembled. The arms are directed axially or nearly axially in the region of the passage openings and the lips behind the balls are formed on the arms in the region of the projections.

The passage openings widen toward the axial front side of the comb separator. A grease gun nozzle, for example, can be placed in those widened openings In addition, there is a circumferential groove which opens toward the front axial side of the comb separator to reduce the mass of the comb separator, and this may facilitate the insertion of lubricant.

The alternating arrangement of arms having passage openings with arms having positioning lips and projections between the lips produces a separator which satisfies the requirements which arise on the ejection of the separator from the mold that forms the separator. Further, it permits guidance of the bearing balls into respective separator pockets. These elements result in simple axial mounting of a separator in the interior of the bearing to which access is otherwise difficult. In order to fix the separator axially, the arms with the projections also have resilient lips which engage behind the balls and the balls are axially fixed in the raceways, fixing the separator thereby.

The arms extend in an axial direction in the region of the passage openings. This does not interfere with the axial fixing of the separator since the area of the opening of the ball pockets at the front side is smaller than the largest ball diameter. There are also passage openings of large cross sections which permit the desired favorable distribution of lubricant.

In the present structure, a further advantage is obtained when fiberglass reinforced plastics of low resilience is used for the separator, since the free holding lips formed on one side the separators are sufficiently resilient even with this material to position the balls. Feeding of the lubricant is facilitated by the fact that the passage openings extend into funnel shaped openings at the continuation of the passage of such openings This facilitates the proper positioning for instance, of the nozzle or end pieces of a grease gun. The provision of the circumferential groove which is open on the front side, reduces the weight of the separator and the lubricant storage space is increased on this side.

The foregoing and other objects and features of the present invention will become apparent in the following description and accompanying drawings.

BRIEF DESCRIPTION OF THE DRAWINGS

FIG. 1 is a partial longitudinal section through a bearing including a separator of the present invention.

FIG. 2 is an axial top view of the separator of the present invention.

FIG. 3 shows a portion of the separator of FIG. 1 as viewed at an angle to the view of FIG. 2 and in radial top view.

DETAILED DESCRIPTION OF THE PREFERRED EMBODIMENT

The bearing of FIG. 1 has particular application in a water pump. But its usefulness is not so limited. The bearing includes a shaft 1 with two axially spaced inner raceways defined in it, each for receiving one of the two rows of bearing balls 3. An outer ring 4 surrounds and is spaced from the shaft and includes its own respective raceways which correspond in axial position to the inner raceways. Sealing rings 5 are arranged in the conventional manner on the two open axial sides of the bearing between the outer ring and the inner shaft and create a closed interior space 6.

Each of the two rows of balls 3 is provided in the customary manner with a comb separator 7 which, for a bearing of this type, can be introduced only subsequent to bearing ring assembly and is introduced axially from the outside before the installation of the sealing rings 5. This type of construction, however, has previously resulted in difficulties experienced with introducing the separator, fixing of the separator, and introducing of lubricant.

As can be seen in FIGS. 2 and 3, the separator is axially fixed through the comb separator 7 providing holding lips 9 on the free ends of the arms 8 of the comb separator. Certain of the lips engage behind the balls 3'. In this way, the separator 7 is prevented from moving out axially. In order to ease introduction of the balls 3 into the separator pockets 10, projections 11, which guide the balls 3' into the pockets 10, are arranged between the lips 9. These projections 11, however, prevent provision of axial passage openings for lubricant in their respective arms 8.

Lubricant passage openings 12 are provided in first alternate arms 8 and projections 11 are provided in the other alternate arms 8. This provides a sufficient number of the openings 12 for the introduction of the lubricant and provides for uniform distribution of lubricant around the circumference of the separator 7. In the arms with the openings 12, no elements like lips which engage behind the balls are required because the lips 9 on the arms 8 at only one circumferential one side of each ball pocket cooperate with the other axially directed arm 8 which defines each pocket to constrict the pocket openings to such an extent that the balls 3' are gripped around sufficiently.

In FIG. 3, funnel shaped or generally conically shaped depressions 12', which widen axially toward the outside are arranged in the ring section 7' of comb separator 7. Each depression 12' is a continuation of the respective passage opening 12. This facilitates the passage of lubricant from the depression 12' into the opening 12. Also, the widening of the funnel axially outward enables proper positioning of the grease gun nozzle in the funnel depression.

Since a light weight separator with large lubricant storage space is frequently desired, a circumferential groove 13 which is open on the axially outward side may also be provided in the annular ring section 7'. Furthermore, when using an annular nozzle, the uniform introduction of the grease is greatly facilitated by the presence of circumferentially distributed openings 12.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A generally comb shaped annular separator for use in ball bearings comprising:
   an annular ring at a first axial side of the separator; the separator having a second axial side away from the first side for receiving bearing balls therein, and the separator having generally axially extending arms on the second axial side and spaced circumferentially around the separator for defining pockets for receiving bearing balls between circumferentially neighboring pairs of the arms; first ones of the arms alternating with second ones of the arms circumferentially around the separator;
   the first arms each having two holding lips defined on them, with a respective one of the holding lips defined on the first arm for engaging behind each of the balls at that first arm, and the respective lip supporting the bearing ball in the respective pocket defined between that first arm and the neighboring second arm for holding the balls in the respective pockets;
   each first arm further having a projection therefrom extending generally axially toward the second axial side, and the projection being circumferentially next to without interfering with movement of the respective lips defined on the respective first arm;
   passage openings for entrance of lubricant axially extending through at least some of the second arms from the first axial side at the ring of the separator to the second axial side at the ends of the arms.

2. The comb separator of claim 1, wherein each of the first arms has a respective one of the lips at each circumferential side of the first arm, with the lip at each circumferential side for engaging behind the ball in the respective pocket at that circumferential side of the first arm; and the respective projection of that arm projecting generally axially and into the space between the lips.

3. The comb separator of claim 1, further comprising depressions opening toward the first axial side of the separator and each depression on the first axial side of the separator being a continuation of the respective passage opening in a respective arm.

4. The comb separator of claim 3, wherein the depressions gradually narrow in cross section from a wider cross section at the first axial side of the separator and narrow toward the passage openings 5. The comb separator of claim 1, further comprising a circumferential groove extending around the comb separator at the first axial side of the separator and being open toward the first axial side and extending past all of the arms.

6. A ball bearing comprising;
   an inner raceway, an outer ring disposed around the inner raceway and radially spaced therefrom, roller bearing balls disposed between the inner raceway and the outer ring;
   and a comb separator disposed in the radial space between the inner raceway and the outer ring, the separator comprising:
   an annular ring at a first axial side of the separator; the separator having a second axial side away from the first side for receiving bearing balls therein, and the separator having generally axially extending arms on the second axial side and spaced circumferentially around the separator for defining pockets for receiving bearing balls between circumferentially neighboring pairs of the arms;
   the first arms each having two holding lips defined on them, with a respective one of the holding lips defined on the first arm for engaging behind each of the balls at that first arm, and the respective lip supporting the bearing ball in the respective pocket defined between that first arm and the neighboring second arm for holding the balls in the respective pockets;
   each first arm further having a projection therefrom extending generally axially toward the second axial side, and the projection being circumferentially next to without interfering with movement of the respective lips defined on the respective first arm;

passage openings for entrance of lubricant axially extending through at least some of the second arms from the first axial side at the ring of the separator to the second axial side at the ends of the arms;

the comb separator having a respective bearing ball in each of the pockets defined in the separator between the arms thereof.

7. The bearing of claim 6, further comprising a shaft extending through the bearing and the inner raceway being defined in the shaft.

8. The bearing of claim 7, further comprising a seal axially outward of the respective separator and sealing the radial space between the shaft and the outer ring.

* * * * *